US012782627B2

(12) United States Patent
Yano et al.

(10) Patent No.: US 12,782,627 B2
(45) Date of Patent: Nov. 3, 2026

(54) BONDING LAYER-COATED POLARIZING FILM, POLARIZING PLATE, AND PRODUCTION METHOD FOR SAME

(71) Applicant: OKURA INDUSTRIAL CO., LTD., Kagawa (JP)

(72) Inventors: Takahisa Yano, Kagawa (JP); Keisuke Goto, Kagawa (JP); Kazunori Noma, Kagawa (JP); Hiroyuki Morimoto, Kagawa (JP)

(73) Assignee: OKURA INDUSTRIAL CO., LTD., Kagawa (JP)

( * ) Notice: Subject to any disclaimer, the term of this patent is extended or adjusted under 35 U.S.C. 154(b) by 113 days.

(21) Appl. No.: 18/843,264

(22) PCT Filed: Feb. 28, 2023

(86) PCT No.: PCT/JP2023/007319
§ 371 (c)(1),
(2) Date: Sep. 1, 2024

(87) PCT Pub. No.: WO2023/167188
PCT Pub. Date: Sep. 7, 2023

(65) Prior Publication Data

US 2025/0189710 A1 Jun. 12, 2025

(30) Foreign Application Priority Data

Mar. 3, 2022 (JP) ................................ 2022-032583

(51) Int. Cl.
*B29C 65/00* (2006.01)
*B32B 7/12* (2006.01)
(Continued)

(52) U.S. Cl.
CPC ................ *G02B 5/305* (2013.01); *B32B 7/12* (2013.01); *B32B 9/002* (2013.01); *B32B 9/045* (2013.01);
(Continued)

(58) Field of Classification Search
CPC .......... B29C 65/48; B29C 65/50; G02B 5/305
See application file for complete search history.

(56) References Cited

U.S. PATENT DOCUMENTS

2013/0344345 A1* 12/2013 Sakellarides ............. B32B 7/12 428/458
2015/0323824 A1* 11/2015 Hisakado .................. C08J 5/18 428/1.31
(Continued)

FOREIGN PATENT DOCUMENTS

EP 4293397 12/2023
JP 2009098465 5/2009
(Continued)

OTHER PUBLICATIONS

"Search Report of Europe Counterpart Application", issued on May 23, 2025, pp. 1-8.
(Continued)

*Primary Examiner* — Philip C Tucker
*Assistant Examiner* — Nickolas R Harm
(74) *Attorney, Agent, or Firm* — JCIPRNET

(57) ABSTRACT

[Problem] The purpose of the present invention is to provide a bonding layer-coated polarizing film that has, at the surface thereof, a bonding layer that makes it possible to achieve excellent adhesion between a polarizing film and another member such as a support substrate.
[Solution] According to the present invention, a bonding layer-coated polarizing film includes a polarizing film that comprises a polyvinyl alcohol resin and, at at least one
(Continued)

surface of the polarizing film, a bonding layer that comprises a molecular bonding agent that bonds by chemical bonding. The bonding layer-coated polarizing film is characterized in that the molecular bonding agent includes a triazine derivative and in that the nitrogen (N) atom concentration at the surface of the bonding layer as measured by X-ray photoelectron spectroscopy is no more than 12.0 atm %.

9 Claims, 1 Drawing Sheet

(51) Int. Cl.

| | |
|---|---|
| ***B32B 9/00*** | (2006.01) |
| ***B32B 9/04*** | (2006.01) |
| ***B32B 37/06*** | (2006.01) |
| ***B32B 37/10*** | (2006.01) |
| ***G02B 5/30*** | (2006.01) |
| *B29C 65/48* | (2006.01) |
| *B29C 65/50* | (2006.01) |

(52) U.S. Cl.

CPC .............. *B32B 37/06* (2013.01); *B32B 37/10* (2013.01); *B29C 65/48* (2013.01); *B29C 65/50* (2013.01); *B32B 2250/02* (2013.01); *B32B 2307/414* (2013.01); *B32B 2307/42* (2013.01); *B32B 2329/04* (2013.01)

(56) References Cited

U.S. PATENT DOCUMENTS

| | | | | |
|---|---|---|---|---|
| 2017/0184766 | A1* | 6/2017 | Ozawa | C08F 2/50 |
| 2017/0269271 | A1* | 9/2017 | Hatanaka | G02B 5/305 |
| 2018/0200988 | A1* | 7/2018 | Kaneiwa | G02B 5/3033 |

FOREIGN PATENT DOCUMENTS

| | | |
|---|---|---|
| JP | 2010254793 | 11/2010 |
| JP | 2019096488 | 6/2019 |
| WO | 2012043631 | 4/2012 |
| WO | 2013154139 | 10/2013 |
| WO | 2013186941 | 12/2013 |
| WO | 2022172755 | 8/2022 |

OTHER PUBLICATIONS

"International Search Report (Form PCT/ISA/210) of PCT/JP2023/007319", mailed on May 23, 2023, with English translation thereof, pp. 1-6.

"Request for the Submission of an Opinion of Korea Counterpart Application", issued on Apr. 28, 2026, with English translation thereof, p. 1-p. 9.

* cited by examiner

BONDING LAYER-COATED POLARIZING FILM, POLARIZING PLATE, AND PRODUCTION METHOD FOR SAME

CROSS-REFERENCE TO RELATED APPLICATION

This application is a 371 application of the International PCT application serial no. PCT/JP2023/007319, filed on Feb. 28, 2023, which claims the priority benefits of Japan Patent Application No. 2022-032583, filed on Mar. 3, 2022. The entirety of each of the above-mentioned patent applications is hereby incorporated by reference herein and made a part of this specification.

TECHNICAL FIELD

The present invention relates to a polarizing film having a bonding layer on a surface thereof, and more specifically relates to a bonding layer-coated polarizing film including a polarizing film that contains a polyvinyl alcohol-based resin and a bonding layer that contains a molecular bonding agent, a polarizing plate formed using the bonding layer-coated polarizing film, and a production method for the same.

RELATED ART

Conventionally, polarizing films composed of a polyvinyl alcohol-based resin (PVA polarizing films) have been known as optical members for transmitting light polarized or wave-polarized in a specific direction. A PVA polarizing film is usually laminated with a support substrate composed of translucent organic materials or inorganic materials via an adhesive or glue to be used as a polarizing plate (see Patent Document 1).

A PVA polarizing film is formed by adsorbing and orienting iodine or a dichroic dye onto a uniaxially stretched polyvinyl alcohol-based resin film. However, due to the characteristics of the PVA polarizing film, the PVA polarizing film absorbs light parallel to the absorption axis. Therefore, an increase in temperature of the PVA polarizing film due to the absorbed light energy generates shrinkage stress in the stretching direction, resulting in the problem of thermal shrinkage. When the PVA polarizing film thermally shrinks, the PVA polarizing film has deformation in appearance (or defective appearance) such as unevenness or wrinkles. In an image display device such as a liquid crystal display, a PVA polarizing film with defective appearance causes image defects and reduced contrast.

In a previous invention, the inventors discovered the use of molecular bonding technology for bonding a PVA polarizing film and a support substrate by chemical bonding, with the aim to suppress defective appearance caused by thermal shrinkage of the PVA polarizing film and provide a polarizing plate with excellent durability (see Patent Document 2). The polarizing plate using the molecular bonding technology is capable of efficiently dissipating heat generated in the PVA polarizing film to the support substrate and reducing the thermal load on the PVA polarizing film, and can suppress defective appearance caused by thermal shrinkage of the PVA polarizing film.

CITATION LIST

Patent Documents

Patent Document 1: WO13/154139
Patent Document 2: PCT/JP2022/2859

SUMMARY OF INVENTION

Technical Problem

The molecular bonding technology is technology that bonds members together by chemical bonding with one or several molecular layers, and converts the adherend surface into a surface with one type of functional group and achieves bonding through the bonding of this functional group. Therefore, the amount of molecular bonding agent introduced to the adherend surface is important to ensure appropriate adhesion (or peel strength) between the members. According to the findings of the inventors, the range of the amount of molecular bonding agent introduced to the adherend surface, where appropriate adhesion can be obtained, is very narrow, and if the amount of molecular bonding agent introduced is too much or too little, the adhesion between the members may be insufficient, making it impossible to ensure appropriate adhesion.

In view of such problems, the present invention aims to provide a bonding layer-coated PVA polarizing film that has, on a surface thereof, a bonding layer containing a molecular bonding agent, and the bonding layer-coated PVA polarizing film appropriately ensures the adhesion between the PVA polarizing film and other members such as a support substrate, or has excellent adhesion to other members.

Solution to Problem

The inventors have conducted extensive research in regard to the amount of molecular bonding agent introduced to the surface of a PVA polarizing film, which provides excellent adhesion to other members such as a support substrate, in a bonding layer-coated PVA polarizing film having a bonding layer containing a molecular bonding agent on the surface thereof. As a result, the inventors have found that excellent adhesion to other members such as a support substrate can be achieved by setting the nitrogen (N) atom concentration attributable to the molecular bonding agent at the surface of the bonding layer, as measured by X-ray photoelectron spectroscopy, within a specific range, and have thus completed the present invention.

According to the present invention, (1) a bonding layer-coated polarizing film is provided, including: a polarizing film containing a polyvinyl alcohol-based resin; and a bonding layer containing a molecular bonding agent that bonds by chemical bonding on at least one surface of the polarizing film, in which the molecular bonding agent includes a triazine derivative, and a nitrogen (N) atom concentration at a surface of the bonding layer as measured by X-ray photoelectron spectroscopy is 12.0 atm % or less, (2) the bonding layer-coated polarizing film according to (1) is provided, in which the nitrogen (N) atom concentration at the surface of the bonding layer as measured by X-ray photoelectron spectroscopy is 0.15 atm % or more and 10.0 atm % or less, (3) the bonding layer-coated polarizing film according to (1) or (2) is provided, in which the triazine derivative is a compound including two or more OH groups and/or OH-generating groups and one triazine ring, (4) a polarizing plate is provided, including the bonding layer-coated polarizing film according to any one of (1) to (3), and a support substrate having translucency, in which the bonding layer-coated polarizing film and the support substrate are laminated via the bonding layer, (5) the polarizing plate according to (4) is provided, in which OH groups on the surface of the polarizing film and/or OH groups on a surface of the support substrate are chemically bonded to the OH groups or OH-generating groups of the triazine derivative by dehydration condensation, (6) the polarizing plate according to (4) or (5) is provided, in which the support substrate includes at least one material selected from a group consisting of an organic material, an inorganic material, and an organic-inorganic hybrid material, and (7) a production method for producing the polarizing plate according to any one of (4) to (6) is provided, including: laminating the bonding layer-coated polarizing film and the support substrate via the bonding layer; and thermocompression bonding the bonding layer-coated polarizing film and the support substrate, and bonding the bonding layer-coated polarizing film and the support substrate by chemical bonding.

Effects of Invention

Since the amount of molecular bonding agent introduced to the surface of the PVA polarizing film is appropriately adjusted, the bonding layer-coated polarizing film of the present invention has excellent adhesion to other members such as a support substrate and is capable of appropriately ensuring adhesion to other members such as a support substrate. In addition, the polarizing plate using the bonding layer-coated polarizing film of the present invention is capable of reducing the thermal load on the PVA polarizing film and firmly adhering the support substrate and the polarizing film, thereby making it possible to suppress defective appearance due to thermal shrinkage of the PVA polarizing film and having high durability in that the performance of the PVA polarizing film is maintained for a long period of time.

DESCRIPTION OF EMBODIMENTS

The present invention will be described in detail hereinafter. It should be noted that the present invention is not limited to the following embodiments, and various embodiments can be made within the scope where the effects of the present invention are achieved.

[Bonding layer-coated polarizing film]

Figure 1:
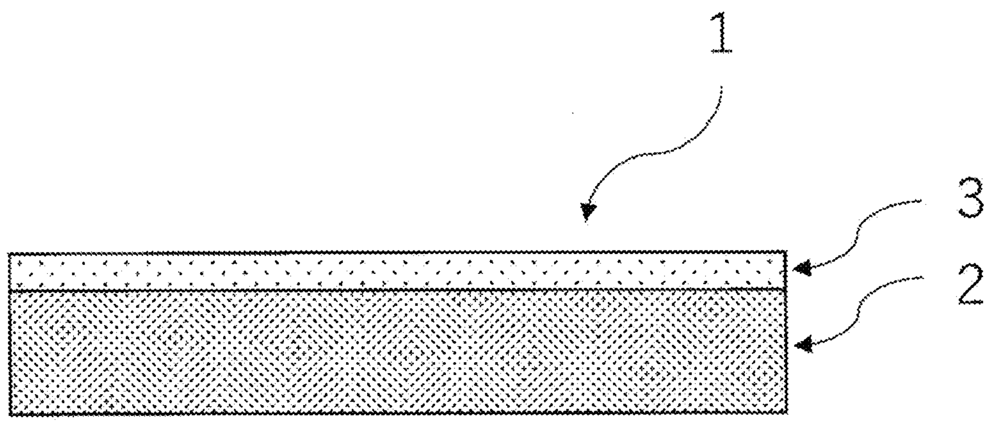
FIG. 1 is a cross-sectional view showing an example of the bonding layer-coated polarizing film of the present invention.

FIG. 1 shows an example of the bonding layer-coated polarizing film of the present invention. The bonding layer-coated polarizing film 1 shown in FIG. 1 includes a polarizing film 2 containing a polyvinyl alcohol-based resin, and a bonding layer 3 containing a molecular bonding agent using molecular bonding technology that bonds by chemical bonding on at least one surface of the polarizing film 2. Although not shown, the other surface of the polarizing film may also be provided with a bonding layer containing a molecular bonding agent.

[Polarizing Film]

The polarizing film has absorptive dichroism at any wavelength of 380 nm to 780 nm, and is made of a polyvinyl alcohol-based resin film. Examples of the polarizing film having absorptive dichroism at any wavelength of 380 nm to 780 nm include a polyvinyl alcohol-based resin film in which iodine and/or a dichroic dye is adsorbed and oriented (H-type polarizing film) and a polyvinyl alcohol-based resin film in which light-absorbing vinylene block segments are formed in a polymer by dehydrating a polyvinyl alcohol resin (K-type polarizing film).

The H-type polarizing film containing a polyvinyl alcohol-based resin in which iodine and/or a dichroic dye is adsorbed and oriented can, for example, be produced by a method including a step of uniaxially stretching a polyvinyl alcohol-based resin film, a step of dyeing the polyvinyl alcohol-based resin film with iodine and/or a dichroic dye for the polyvinyl alcohol-based resin film to adsorb iodine and/or a dichroic dye, a step of crosslinking the polyvinyl alcohol-based resin film having iodine and/or a dichroic dye adsorbed thereon with a crosslinking liquid such as an aqueous boric acid solution, and a step of washing the polyvinyl alcohol-based resin film with water.

A saponified polyvinyl acetate resin can be used as the polyvinyl alcohol-based resin. Examples of the polyvinyl acetate resin include polyvinyl acetate, which is a homopolymer of vinyl acetate, as well as a copolymer of vinyl acetate with other monomers copolymerizable with vinyl acetate. Examples of other monomers copolymerizable with vinyl acetate include unsaturated carboxylic acids, olefins, vinyl ethers, unsaturated sulfonic acids, and (meth)acrylamides having an ammonium group.

The degree of saponification of the polyvinyl alcohol-based resin is usually 85 mol % to 100 mol %, and preferably 98 mol % or more. The polyvinyl alcohol-based resin may be modified. For example, polyvinyl formal or polyvinyl acetal modified with aldehydes may also be used. The average degree of polymerization of the polyvinyl alcohol-based resin is usually 1,000 to 10,000, and preferably 1,500 to 5,000. The average degree of polymerization of the polyvinyl alcohol-based resin can be determined in accordance with JIS K6726.

Such a polyvinyl alcohol-based resin is formed into a film, which is used as a raw film for the polarizing film. The method of forming the polyvinyl alcohol-based resin into a film is not particularly limited, and any known method can be used. The thickness of the polyvinyl alcohol-based raw film is not particularly limited, but is preferably 10 μm to 200 μm, for example.

The uniaxial stretching of the polyvinyl alcohol-based resin film can be performed before, simultaneously with, or after dyeing with iodine and/or a dichroic dye. In a case where uniaxial stretching is performed after dyeing, this uniaxial stretching may be performed before or during the crosslinking treatment. Moreover, uniaxial stretching may be performed in a plurality of these stages. In the uniaxial stretching, the film may be stretched uniaxially between rolls having different peripheral speeds, or may be stretched uniaxially using a heated roll. Furthermore, the uniaxial stretching may be dry stretching in which stretching is performed in the atmosphere, or wet stretching in which stretching is performed in a state where the polyvinyl alcohol-based resin film is swollen using a solvent or water. The stretching ratio is usually 3 to 8 times.

As the method of dyeing the polyvinyl alcohol-based resin film with iodine and/or a dichroic dye, for example, a method of immersing the film in an aqueous solution containing iodine and/or a dichroic dye is used. The polyvinyl alcohol-based resin film is preferably subjected to the water immersion treatment before the dyeing treatment.

Examples of the crosslinking treatment after dyeing include a method of immersing the dyed polyvinyl alcohol-based resin film in an aqueous solution containing boric acid. The crosslinking treatment may be performed in one step or in multiple steps.

The water washing treatment after crosslinking is performed, for example, by immersing the polyvinyl alcohol-based resin film crosslinked after dyeing in water, spraying water as a shower, or combining immersion and spraying. After the water washing treatment, the polyvinyl alcohol-based resin film may be dried by a known method.

The K-type polarizing film containing a polyvinyl alcohol-based resin in which light-absorbing vinylene block segments are formed in the polymer by dehydrating the polyvinyl alcohol resin can, for example, be produced by a method including a step of uniaxially stretching a polyvinyl alcohol-based resin film, a step of dehydrating the polyvinyl alcohol-based resin film, a step of crosslinking the dehydrated polyvinyl alcohol-based resin film with a crosslinking liquid such as an aqueous boric acid solution, and a step of washing the polyvinyl alcohol-based resin film with water. The raw film is as described above.

The uniaxial stretching of the polyvinyl alcohol-based resin film can be performed in various stages. The uniaxial stretching may be performed, for example, before the dehydration treatment, simultaneously with the dehydration treatment, simultaneously with the boric acid crosslinking after the dehydration treatment, or before or after the boric acid crosslinking. Moreover, uniaxial stretching may be performed in a plurality of these stages. The method of uniaxial stretching is as described above.

The method of dehydrating the polyvinyl alcohol-based resin film is performed, for example, by exposing the polyvinyl alcohol-based resin film to an acid having a pH of 3 or more, and then heating the exposed film. Specifically, the polyvinyl alcohol-based resin film can be immersed in deionized water for about 1 second to about 5 minutes, and then immersed in an acid having a pH of 3 or more for a desired period of time. The polyvinyl alcohol-based resin film can also be exposed to a dehydration catalyst in different ways. For example, the film can be dipped or immersed in an aqueous dehydration catalyst for a sufficient residence time to allow the catalyst to diffuse into the film.

The acid used in the dehydration treatment can be any acid having a pH of 3 or more that, in the presence of heat or other suitable treatment conditions, can remove hydrogen atoms and oxygen atoms from the hydroxylated moieties of the linear polymer, and leave conjugated vinylene units. Specific examples include hydrochloric acid, hydrobromic acid, hydroiodic acid, phosphoric acid, and sulfuric acid. Moreover, these acids may be diluted with water or an alcohol such as methanol.

After exposing the polyvinyl alcohol-based resin film to the dehydration catalyst, the polyvinyl alcohol-based resin film and the adsorbent catalyst can be heated, which converts a part of the oriented film into polyvinylene, the desired dehydration product. The film can be heated by conductive heating, convection heating, radiation heating, or a combination of these. For example, the film and the catalyst can pass through a heating oven at a temperature range of about 88° C. to about 205° C. for about a few seconds to about 10 minutes. In another method, the film and the catalyst can be exposed to microwave radiation heating, laser heating, or radiant infrared heating.

In the step of dehydration treatment, a part of the vinyl alcohol-based polymer in the polyvinyl alcohol-based resin film is converted into polarizing molecules of a poly(vinylene-co-vinyl alcohol) block copolymer. The effect of the dehydration treatment is to form conjugated polyvinylene blocks from polyvinyl alcohol blocks. By orienting the PVA matrix in one direction, the transition moments of the conjugated polyvinylene blocks are also oriented, and the material becomes visibly dichroic.

Examples of the crosslinking treatment after the dehydration treatment include a method of immersing the dehydrated polyvinyl alcohol-based resin film in an aqueous solution containing boric acid. Specifically, the dehydrated polyvinyl alcohol-based resin film can be brought into contact with an aqueous boric acid solution having a concentration of 10% to 20% at a temperature of 85° C. to 95° C.

The water washing treatment after crosslinking is performed, for example, by immersing the polyvinyl alcohol-based resin film crosslinked after the dehydration treatment in water, spraying water as a shower, or combining immersion and spraying. After the water washing treatment, the polyvinyl alcohol-based resin film may be dried by a known method.

The thickness of the polarizing film is not particularly limited, but is preferably 50 μm or less, more preferably 30 μm or less, and even more preferably 25 μm or less. The thickness of the polarizing film is usually 1 μm or more, and preferably 3 μm or more.

[Bonding Layer]

The bonding layer contains a molecular bonding agent using molecular bonding technology that bonds by chemical bonding. The molecular bonding technology is technology that bonds members together by chemical bonding with one or several molecular layers, and for example, converts the adherend surface into a surface with one type of functional group and achieves bonding through the bonding of this functional group.

The molecular bonding agent includes a triazine derivative having a functional group that bonds the polarizing film to other members such as a support substrate by chemical bonding. The bonding layer containing the molecular bonding agent that includes the triazine derivative preferably contains the triazine derivative as a main component. Here, "main component" means that the constituent ratio thereof among the components constituting the bonding layer is 50% by weight or more, preferably 60% by weight or more, more preferably 80% by weight or more, even more preferably 90% by weight or more, and particularly preferably 95% by weight or more.

The triazine derivative is preferably a compound containing two or more OH groups and/or OH-generating groups and one triazine ring. The triazine derivative containing two or more OH groups and/or OH-generating groups and one triazine ring forms chemical bonding between the OH groups on the surface of the polarizing film and/or the OH groups of other members such as a support substrate and the OH groups or OH-generating groups of the triazine derivative by dehydration condensation. As the triazine derivative, a conventionally known compound can be used. The OH groups or OH-generating groups are preferably alkoxysilyl groups (including a case where an alkoxy group is an OH group).

The molecular bonding agent may include components other than the triazine derivative within a range where the effects of the present invention are not impaired. Examples of components other than the triazine derivative include a crosslinking agent, fine particles, an ultraviolet absorber, an antifoaming agent, a thickener, a dispersant, a surfactant, a catalyst, a lubricant, and an antistatic agent.

The bonding layer has a nitrogen (N) atom concentration of 12.0 atm % or less at the surface of the bonding layer as measured by X-ray photoelectron spectroscopy (XPS). By setting the nitrogen (N) atom concentration attributable to the molecular bonding agent at the surface of the bonding layer, as measured by X-ray photoelectron spectroscopy, within the above range, the bonding layer-coated polarizing film of the present invention has excellent adhesion to other members such as a support substrate. The upper limit of the nitrogen (N) atom concentration at the surface of the bonding layer is preferably 10.0 atm % or less, more preferably 9.0 atm % or less, even more preferably 8.0 atm % or less, particularly preferably 6.0 atm % or less, and most preferably 3.0 atm % or less. In addition, the lower limit of the nitrogen (N) atom concentration at the surface of the bonding layer is preferably 0.15 atm % or more, more preferably 0.20 atm % or more, even more preferably 0.25 atm % or more, particularly preferably 0.30 atm % or more, and most preferably 0.35 atm % or more.

The nitrogen (N) atom concentration at the surface of the bonding layer, as measured by X-ray photoelectron spectroscopy (XPS), is calculated as a ratio (nitrogen atom concentration) of nitrogen atoms to the sum of carbon atoms, oxygen atoms, nitrogen atoms, and silicon atoms at the surface of the bonding layer by using an X-ray photoelectron spectroscopy device to irradiate a sample with X-rays under the following measurement conditions and perform a narrow scan of carbon atoms, oxygen atoms, nitrogen atoms, and silicon atoms.

Device: ULVAC @ Quantera SXM

X-ray source: Monochromatic AI (25.0 W)

Measurement area: 1000 μm×1000 μm

Measurement depth: 7.2 nm

Sweep: 1 time

Pass energy: 69 eV

Step size: 0.125 eV

Angle: 45°

The upper limit of the thickness of the bonding layer is not particularly limited, but is, for example, preferably 5 μm or less, more preferably 1 μm or less, even more preferably 0.01 μm or less, and particularly preferably 0.001 μm or less. The lower limit of the thickness of the bonding layer is not particularly limited, but is ideally the thickness of one molecular layer for the molecular bonding technology is technology that bonds members together by chemical bonding with one or several molecular layers.

[Method of Producing Bonding Layer-Coated Polarizing Film]

Next, a method of producing a bonding layer-coated polarizing film will be described. The bonding layer-coated polarizing film can be produced by providing a bonding layer containing a molecular bonding agent on the surface of a polarizing film containing a polyvinyl alcohol-based resin.

<Step 1: Preparation>

First, the above-mentioned polarizing film is prepared. The polarizing film may be either a long strip or a sheet. The surface of the polarizing film may be cleaned as necessary. For example, cleaning treatment may be performed with a cleaning agent such as ethanol or acetone. The surface of the polarizing film may be subjected to activation treatment as necessary, such as ultraviolet irradiation treatment, corona discharge treatment, and plasma treatment.

Furthermore, a solution in which the above-mentioned molecular bonding agent is dissolved, or a dispersion liquid is prepared. The molecular bonding agent may be diluted with a solvent, and examples of the solvent include water, alcohols (such as methanol, ethanol, isopropanol, ethylene glycol, propylene glycol, cellosolve, and carbitol), ketones (such as acetone, methyl ethyl ketone, and cyclohexanone), aromatic hydrocarbons (such as benzene, toluene, and xylene), aliphatic hydrocarbons (such as hexane, octane, decane, dodecane, and octadecane), esters (such as ethyl acetate, methyl propionate, and methyl phthalate), ethers (such as tetrahydrofuran, ethyl butyl ether, and anisole), or may be a mixture of these. The content of the triazine derivative may be appropriately set in consideration of the coating operation or the like, and is, for example, 0.00001 wt % to 10 wt %, preferably 0.0001 wt % to 1 wt %, more preferably 0.0005 wt % to 0.5 wt %, and even more preferably 0.001 wt % to 0.2 wt %.

<Step 2: Coating>

The molecular bonding agent is applied to the surface of the polarizing film to form a bonding layer containing the molecular bonding agent on the surface of the polarizing film. Specifically, this is achieved by coating the solution in which the above-mentioned molecular bonding agent is dissolved onto the surface of the polarizing film. Thereafter, drying is performed as necessary, and the solvent evaporates, leaving the molecular bonding agent on the surface of the polarizing film to form the bonding layer. The coating method is not particularly limited, and any known method can be used, such as a wire bar coating method, a dipping method, a spraying method, a spin coating method, a roll coating method, a gravure coating method, an air knife coating method, a curtain coating method, a slide coating method, an extrusion coating method, and a die coating method. The drying method is not particularly limited, and any known method can be used.

[Polarizing Plate]

Figure 2:
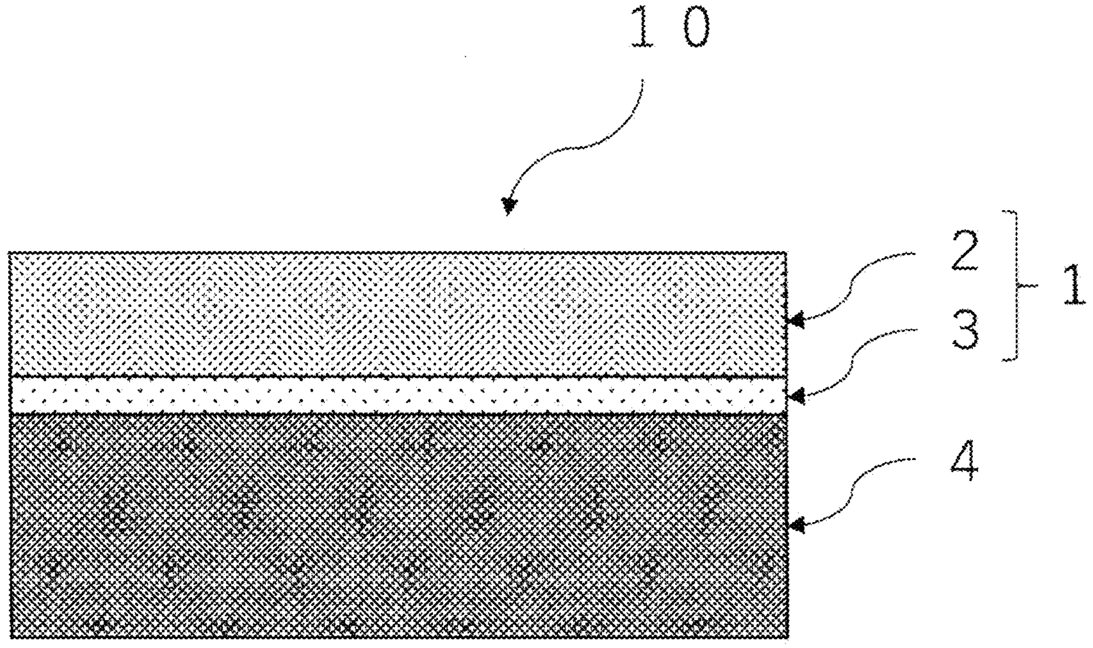
FIG. 2 is a cross-sectional view showing an example of the polarizing plate of the present invention.

FIG. 2 shows an example of the polarizing plate of the present invention. The polarizing plate 10 shown in FIG. 2 includes the bonding layer-coated polarizing film 1 and a support substrate 4. To be more specific, the bonding layer-coated polarizing film 1, which has the bonding layer 3 containing the molecular bonding agent using molecular bonding technology that bonds by chemical bonding, and the support substrate 4 are laminated via the bonding layer 3 on at least one surface of the polarizing film 2. The polarizing plate of the present invention is formed by laminating the polarizing film and the support substrate via the bonding layer that contains the molecular bonding agent, so that OH groups on the surface of the polarizing film and/or OH groups on the support substrate form chemical bonding with OH groups or OH-generating groups of the molecular bonding agent by dehydration condensation. Although not shown, the other surface of the polarizing film may also be provided with another support substrate via a bonding layer that contains a molecular bonding agent.

[Support Substrate]

The support substrate supports the polarizing film, which is easily broken and difficult to handle alone, and facilitates the handling as well as protects the polarizing film. The support substrate is made of a material that has translucency to visible light. The term "translucency" here means that the total light transmittance is 80% or more, preferably 85% or more, and more preferably 90% or more. The light transmittance can be measured in accordance with JIS K0115 using a spectrophotometer (UV-visible near-infrared spectrophotometer "V-570" manufactured by JASCO Corporation).

Examples of the material that has translucency to visible light include organic materials, inorganic materials, and organic-inorganic hybrid materials. Examples of the organic materials include triacetyl cellulose, diacetyl cellulose, polyester resins, polyimide resins, polyamides, polyolefin resins such as polyethylene and polypropylene, cycloolefin resins such as cycloolefin polymers and cycloolefin copolymers, polyethersulfone, polysulfone, polyvinyl chloride, acrylic resins, polycarbonate resins, and urethane resins. Examples of the inorganic materials include silicate glass, borosilicate glass, titanium silicate glass, fluoride glass such as zirconium fluoride, fused quartz, crystal, sapphire, YAG crystal, fluorite, magnesia, and spinel ($MgO \cdot Al_2O_3$). Examples of the organic-inorganic hybrid materials include resins made of silsesquioxane derivatives having organic functional groups such as (meth)acryloyl groups.

From the viewpoint of efficiently dissipating heat generated in the polarizing film to the outside and suppressing thermal shrinkage of the polarizing film, it is preferable that the support substrate laminated on at least one surface of the polarizing film has a higher thermal conductivity than the polarizing film. The thermal conductivity is, for example, preferably 0.7 W/mK or more, more preferably 1 W/mK or more, and even more preferably 5 W/mK or more. Examples of such materials include sapphire (thermal conductivity: 40 W/mK) and quartz (thermal conductivity: 8 W/mK).

The thickness of the support substrate is not particularly limited, and may be appropriately set so as to facilitate the handling of the polarizing film and to protect the polarizing film. The thickness is, for example, 10 μm to 3000 μm, preferably 20 μm to 1500 μm, and more preferably 30 μm to 1000 μm.

A bonding layer containing the above-mentioned molecular bonding agent may be formed on the surface of the support substrate as necessary. The nitrogen (N) atom concentration at the surface of the bonding layer of the support substrate, as measured by X-ray photoelectron spectroscopy (XPS), is not particularly limited. For example, the upper limit is preferably 50.0 atm % or less, more preferably 40.0 atm % or less, and even more preferably 30.0 atm % or less. The lower limit of the nitrogen (N) atom concentration is preferably 0.15 atm % or more, more preferably 0.50 atm % or more, and even more preferably 1.00 atm % or more.

Furthermore, various functional layers may be formed on the surface of the support substrate as necessary. Examples of the functional layers include a conductive layer, an antistatic layer, an antiglare (non-glare) layer, an antifouling layer such as a photocatalyst layer, an antireflection layer, a hard coat layer, an ultraviolet shielding layer, a heat ray shielding layer, an electromagnetic wave shielding layer, and a gas barrier layer.

[Method of Producing Polarizing Plate]

Next, a Method of Producing the Polarizing Plate Will be Described. The Method of producing the polarizing plate includes a step of laminating the above-mentioned bonding layer-coated polarizing film and support substrate via the bonding layer, and a step of thermocompression bonding the bonding layer-coated polarizing film and the support substrate to bond the bonding layer-coated polarizing film and the support substrate by chemical bonding.

<Step 3: Lamination>

The bonding layer-coated polarizing film and the support substrate are laminated via the bonding layer of the bonding layer-coated polarizing film. Specifically, this is achieved by coating the solution in which the molecular bonding agent is dissolved, and laminating the bonding layer-coated polarizing film formed with the bonding layer containing the molecular bonding agent on the surface and the support substrate, with the surface of the bonding layer of the bonding layer-coated polarizing film and the surface of the support substrate facing each other.

<Step 4: Thermocompression Bonding>

Next, the bonding layer-coated polarizing film and the support substrate are thermocompression bonded, so that the bonding layer-coated polarizing film and the support substrate are integrally bonded to each other by chemical bonding. Specifically, this is achieved by heating the bonding layer-coated polarizing film while applying a pressing force toward the support substrate side, heating the support substrate while applying a pressing force toward the bonding layer-coated polarizing film side, or heating the bonding layer-coated polarizing film and the support substrate while applying a pressing force from the respective sides.

The pressing force is a pressing force for bringing the OH groups of the triazine derivative present on the surface of the polarizing film and/or the support substrate or the OH groups generated from the OH-generating groups into contact with the other surface. The pressing force is, for example, preferably 0.01 MPa to 50 MPa, more preferably 0.1 MPa to 20 MPa, even more preferably 0.5 MPa to 15 MPa, and particularly preferably 1 MPa to 10 MPa. The time of application of the pressing force is, for example, 0.1 to 200 minutes. Thus, even if there is minute unevenness on the surface of the bonding layer-coated polarizing film or the support substrate, the bonding layer-coated polarizing film or the support substrate deforms accordingly for the OH groups or OH-generating groups of the triazine derivative present on these surfaces to reach and bond to the other surface. That is, the bonding layer-coated polarizing film and the support substrate are firmly bonded together by chemical bonding (reaction) caused by the triazine derivative. The heating temperature is a temperature at which the chemical reaction of the triazine derivative is promoted. The heating temperature is, for example, 30° C. to 300° C., preferably 50° C. to 250° C., more preferably 70° C. to 200° C., and even more preferably 80° C. to 150° C.

EXAMPLES

The present invention will be described in more detail below with reference to examples. Nevertheless, the present invention is not limited to the following examples.

[Preparation of Bonding Layer-Coated Polarizing Film]

An iodine-based polarizing film (length 100 mm×width 100 mm) having a thickness of 25 μm and laminated with a surface protective film was prepared, and the surface of the polarizing film on the side opposite to the surface with the surface protective film laminated thereon was washed with ethanol and dried, and then the surface was subjected to corona discharge treatment (150 $W \cdot min/m^2$). An aqueous solution containing a triazine derivative (product name: MB1015 aqueous solution, manufactured by Sulfur Chemical Laboratory Inc.) adjusted to the solid content concentration (content concentration of the triazine derivative) shown in Table 1 was applied to the corona discharge-treated surface of the polarizing film by a spin coating method (application amount: 2 ml, spin rotation speed: 3000 rpm), and then dried in a constant temperature and humidity dryer (50° C.×10 minutes) to prepare a bonding layer-coated polarizing film (Samples 1 to 5) having a bonding layer on the surface of the polarizing film. Further, a polarizing film (Sample 6) having no bonding layer on the surface was prepared.

The nitrogen (N) atom concentration at the surface of the bonding layer of the bonding layer-coated polarizing film (Samples 1 to 5) and the nitrogen (N) atom concentration at the polarizing film surface of the polarizing film (Sample 6)

having no bonding layer on the surface were measured. The measurement results are shown in Table 1.

<Nitrogen (N) Atom Concentration Measurement>

The sample was irradiated with X-rays under the following measurement conditions using an X-ray photoelectron spectroscopy device to perform a narrow scan of carbon atoms, oxygen atoms, nitrogen atoms, and silicon atoms, and the ratio of nitrogen atoms to the sum of carbon atoms, oxygen atoms, nitrogen atoms, and silicon atoms at the surface of the bonding layer or the surface of the polarizing film was calculated. Then, measurements were taken at any five points on the surface of the sample, and the average value was taken as the nitrogen (N) atom concentration.

Device: ULVAC & Quantera SXM
X-ray source: Monochromatic Al (25.0 W)
Measurement area: 1000 μm×1000 μm.
Measurement depth: 7.2 nm
Sweep: 1 time
Pass energy: 69 e V
Step size: 0.125 eV
Angle: 45°

TABLE 1

| | Polarizing film | Bonding layer | | |
|---|---|---|---|---|
| | Type | Molecular bonding agent concentration (wt %) | Molecular bonding agent application amount (ml) | Nitrogen atom concentration (atm %) |
| Sample 1 | PVA | 0.0001 | 2 | 0.08 |
| Sample 2 | PVA | 0.001 | 2 | 0.21 |
| Sample 3 | PVA | 0.01 | 2 | 1.77 |
| Sample 4 | PVA | 0.1 | 2 | 8.81 |
| Sample 5 | PVA | 0.5 | 2 | 12.40 |
| Sample 6 | PVA | 0 | 0 | 0.10 |

As shown in Table 1, the bonding layer-coated polarizing films of Samples 1 to 5, in which the coating liquid containing the molecular bonding agent was applied to the surface of the polarizing film to form the bonding layer containing the molecular bonding agent, showed the results that the nitrogen atom concentration at the surface of the bonding layer increased as the solid content concentration of the molecular bonding agent in the coating liquid increased. Furthermore, the polarizing film of Sample 6, which did not have a bonding layer on the surface, showed the result of a higher nitrogen atom concentration than Sample 1, which is presumably due to the detection of nitrogen in the atmosphere on the sample surface.

[Preparation of Polarizing Plate]

Example 1

A quartz substrate (length 23.5 mm×width 20.0 mm×thickness 0.7 mm) was prepared as a support substrate. The quartz substrate was ultrasonically cleaned in acetone (10 minutes) and dried, and then the surface was subjected to corona discharge treatment (150 W·min/m$^2$). An aqueous solution containing 0.1% by weight of a triazine derivative (product name: MB1015 aqueous solution, manufactured by Sulfur Chemical Laboratory Inc.) was applied to the corona discharge-treated surface of the quartz substrate by a spin coating method (application amount: 2 ml, spin rotation speed: 3000 rpm), and then the quartz substrate was placed in a hot air dryer and dried at 80° C. for 10 minutes to provide the triazine derivative on the surface of the quartz substrate.

Next, the bonding layer-coated polarizing film (Sample 4) prepared above and the surface of the quartz substrate on which the triazine derivative was provided were overlapped, and thermocompression bonding was performed using a heat press (pressure: 10 MPa, temperature: 100° C., time: 12 minutes) to prepare a polarizing plate. The nitrogen atom concentration at the surface of the quartz substrate including the triazine derivative was measured by the method described above.

Example 2

A polarizing plate was prepared in the same manner as in Example 1, except that Sample 3 was used as the bonding layer-coated polarizing film.

Example 3

A polarizing plate was prepared in the same manner as in Example 1, except that Sample 2 was used as the bonding layer-coated polarizing film.

Example 4

A polarizing plate was prepared in the same manner as in Example 1, except that the solid content concentration of the aqueous solution containing the triazine derivative to be applied to the quartz substrate was 0.01% by weight, and Sample 3 was used as the bonding layer-coated polarizing film.

Example 5

A polarizing plate was prepared in the same manner as in Example 1, except that the solid content concentration of the aqueous solution containing the triazine derivative to be applied to the quartz substrate was 0.01% by weight, and Sample 2 was used as the bonding layer-coated polarizing film.

Example 6

A polarizing plate was prepared in the same manner as in Example 1, except that the solid content concentration of the aqueous solution containing the triazine derivative to be applied to the quartz substrate was 0.01% by weight, and Sample 1 was used as the bonding layer-coated polarizing film.

Example 7

A polarizing plate was prepared in the same manner as in Example 1, except that the solid content concentration of the aqueous solution containing the triazine derivative to be applied to the quartz substrate was 0.001% by weight, and Sample 3 was used as the bonding layer-coated polarizing film.

Example 8

A polarizing plate was prepared in the same manner as in Example 1, except that the solid content concentration of the aqueous solution containing the triazine derivative to be applied to the quartz substrate was 0.001% by weight, and Sample 2 was used as the bonding layer-coated polarizing film.

Example 9

A polarizing plate was prepared in the same manner as in Example 1, except that a quartz substrate having no triazine derivative on the surface thereof was used as the support substrate, and Sample 3 was used as the bonding layer-coated polarizing film.

Example 10

A polarizing plate was prepared in the same manner as in Example 1, except that a quartz substrate having no triazine derivative on the surface thereof was used as the support substrate, and Sample 2 was used as the bonding layer-coated polarizing film.

Example 11

A polarizing plate was prepared in the same manner as in Example 1, except that a quartz substrate having no triazine derivative on the surface thereof was used as the support substrate, and Sample 1 was used as the bonding layer-coated polarizing film.

Example 12

A polarizing plate was prepared in the same manner as in Example 1, except that the support substrate was a 50 μm-thick ultraviolet-curable organic-inorganic copolymer film (length 23.5 mm× width 20.0 mm) containing a silsesquioxane derivative having a (meth)acryloyl group, and Sample 3 was used as the bonding layer-coated polarizing film.

Example 13

A polarizing plate was prepared in the same manner as in Example 1, except that the support substrate was a 50 μm-thick ultraviolet-curable organic-inorganic copolymer film (length 23.5 mm× width 20.0 mm) containing a silsesquioxane derivative having a (meth)acryloyl group, and Sample 2 was used as the bonding layer-coated polarizing film.

Comparative Example 1

A polarizing plate was prepared in the same manner as in Example 1, except that the solid content concentration of the aqueous solution containing the triazine derivative to be applied to the quartz substrate was 0.5% by weight, and Sample 5 was used as the bonding layer-coated polarizing film.

Comparative Example 2

A polarizing plate was prepared in the same manner as in Example 1, except that Sample 6 was used as the polarizing film.

The polarizing plates obtained in Examples 1 to 13 and Comparative Examples 1 and 2 were evaluated as follows. The evaluation results are shown in Table 2. In the following evaluation, a polarizing plate from which the surface protective film had been peeled off was used.

<Peel Strength Measurement>

A polyethylene terephthalate film (thickness: 100 μm, model number: A4100, manufactured by Toyobo Co., Ltd.) was laminated on the surface of the polarizing film of the polarizing plate obtained in each of the Examples and Comparative Examples via an adhesive layer (thickness: 15 μm, NCF-211S, manufactured by Lintec Corporation), and pressed with a hand roller to obtain a laminate. Next, with the support substrate of the laminate fixed to a pedestal, the polarizing film and the polyethylene terephthalate film laminated via the adhesive layer were gripped, and the peel strength at 90 degrees was measured in accordance with JIS Z0237-2009. The peel strength was expressed in units of (N/25 mm).

TABLE 2

| | Bonding layer-coated polarizing film | | | Support substrate | | |
|---|---|---|---|---|---|---|
| | Type | | Nitrogen atom concentration (atm %) | Type | Nitrogen atom concentration (atm %) | Peel strength (N/25 mm) |
| Example 1 | Sample 4 | PVA | 8.81 | Quartz | 19.6 | 1.3 |
| Example 2 | Sample 3 | PVA | 1.77 | Quartz | 19.6 | 4.3 |
| Example 3 | Sample 2 | PVA | 0.21 | Quartz | 19.6 | 5.1 |
| Example 4 | Sample 3 | PVA | 1.77 | Quartz | 10.1 | 4.6 |
| Example 5 | Sample 2 | PVA | 0.21 | Quartz | 10.1 | 4.1 |
| Example 6 | Sample 1 | PVA | 0.08 | Quartz | 10.1 | 4.3 |
| Example 7 | Sample 3 | PVA | 1.77 | Quartz | 1.0 | 3.0 |
| Example 8 | Sample 2 | PVA | 0.21 | Quartz | 1.0 | 3.3 |
| Example 9 | Sample 3 | PVA | 1.77 | Quartz | 0.1 | 3.9 |
| Example 10 | Sample 2 | PVA | 0.21 | Quartz | 0.1 | 3.3 |
| Example 11 | Sample 1 | PVA | 0.08 | Quartz | 0.1 | 3.6 |
| Example 12 | Sample 3 | PVA | 1.77 | Organic-inorganic copolymer | 22.1 | 3.9 |
| Example 13 | Sample 2 | PVA | 0.21 | Organic-inorganic copolymer | 22.1 | 3.4 |
| Comparative Example 1 | Sample 5 | PVA | 12.40 | Quartz | 28.5 | 0.4 |
| Comparative Example 2 | Sample 6 | PVA | 0.10 | Quartz | 19.6 | 0.6 |

As shown in Table 2, the bonding layer-coated polarizing film in which the nitrogen (N) atom concentration attributable to the molecular bonding agent at the surface of the bonding layer, as measured by X-ray photoelectron spectroscopy, was 12.0 atm % or less showed the results that adhesion to other members such as the support substrate was excellent regardless of the type of the support substrate or whether the molecular bonding agent was present on the support substrate side. On the other hand, the bonding layer-coated polarizing film in which the nitrogen (N) atom concentration attributable to the molecular bonding agent at the surface of the bonding layer, as measured by X-ray photoelectron spectroscopy, exceeded 12.0 atm % showed the results of poor adhesion to other members such as the support substrate. Furthermore, the polarizing film that did not have a bonding layer containing the molecular bonding agent on the surface was simply heat-pressed with the support substrate without thermocompression bonding, and showed the results of poor adhesion between the polarizing film and the support substrate.

As can be seen from the above results, in molecular bonding technology that bonds members together by chemical bonding with one or several molecular layers, excellent adhesion to other members such as a support substrate can be achieved by introducing an extremely small amount of molecular bonding agent to the surface of the polarizing film, and the amount of molecular bonding agent introduced to the surface of the polarizing film can be achieved by setting the nitrogen (N) atom concentration attributable to the molecular bonding agent, as measured by X-ray photoelectron spectroscopy, to 12.0 atm % or less. Due to the measurement principle of an X-ray photoelectron spectroscopy device, nitrogen atoms in the atmosphere are detected, making it difficult to determine the lower limit of the amount of molecular bonding agent introduced to the surface of the polarizing film from the nitrogen (N) atom concentration measured by X-ray photoelectron spectroscopy. However, in a state where the molecular bonding agent is present on the surface of the polarizing film, it is possible to achieve excellent adhesion to other members such as a support substrate.

What is claimed is:

1. A bonding layer-coated polarizing film, comprising:

a polarizing film comprising a polyvinyl alcohol-based resin; and a bonding layer comprising a molecular bonding agent that bonds by chemical bonding on at least one surface of the polarizing film, wherein the molecular bonding agent comprises a triazine derivative, and a nitrogen (N) atom concentration at a surface of the bonding layer as measured by X-ray photoelectron spectroscopy is 12.0 atm % or less.

2. The bonding layer-coated polarizing film according to claim 1, wherein the nitrogen (N) atom concentration at the surface of the bonding layer as measured by X-ray photoelectron spectroscopy is 0.15 atm % or more and 10.0 atm % or less.

3. The bonding layer-coated polarizing film according to claim 2, wherein the triazine derivative is a compound comprising two or more OH groups and/or OH-generating groups and one triazine ring.

4. The bonding layer-coated polarizing film according to claim 1, wherein the triazine derivative is a compound comprising two or more OH groups and/or OH-generating groups and one triazine ring.

5. A polarizing plate, comprising the bonding layer-coated polarizing film according to claim 1, and a support substrate having translucency, wherein the bonding layer-coated polarizing film and the support substrate are laminated via the bonding layer.

6. The polarizing plate according to claim 5, wherein the triazine derivative is a compound comprising two or more OH groups and/or OH-generating groups and one triazine ring, and OH groups on the surface of the polarizing film and/or OH groups on a surface of the support substrate are chemically bonded to the OH groups or OH-generating groups of the triazine derivative by dehydration condensation.

7. The polarizing plate according to claim 5, wherein the support substrate comprises at least one material selected from a group consisting of an organic material, an inorganic material, and an organic-inorganic hybrid material.

8. The polarizing plate according to claim 5, wherein the support substrate comprises at least one material selected from a group consisting of an organic material, an inorganic material, and an organic-inorganic hybrid material.

9. A production method for producing the polarizing plate according to claim 5, the production method comprising:

laminating the bonding layer-coated polarizing film and the support substrate via the bonding layer; and thermocompression bonding the bonding layer-coated polarizing film and the support substrate, and bonding the bonding layer-coated polarizing film and the support substrate by chemical bonding.

* * * * *